United States Patent
Hopkins

(10) Patent No.: US 9,556,929 B2
(45) Date of Patent: Jan. 31, 2017

(54) END FITTINGS FOR DRIVE SHAFT ASSEMBLIES

(71) Applicant: Hamilton Sundstrand Corporation, Charlotte, NC (US)

(72) Inventor: Gregory C. Hopkins, Caledonia, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/672,606

(22) Filed: Mar. 30, 2015

(65) Prior Publication Data

US 2016/0290436 A1 Oct. 6, 2016

(51) Int. Cl.
| | |
|---|---|
| F16F 7/10 | (2006.01) |
| F16F 15/34 | (2006.01) |
| B64D 41/00 | (2006.01) |
| F16D 1/064 | (2006.01) |
| F16C 3/02 | (2006.01) |

(52) U.S. Cl.
CPC ............. *F16F 15/34* (2013.01); *B64D 41/007* (2013.01); *F16C 3/023* (2013.01); *F16D 1/064* (2013.01)

(58) Field of Classification Search
CPC ........ B64D 41/007; F16C 3/023; F16D 1/064; F16F 15/34; Y10T 464/20; Y10T 464/40; Y10T 464/50

USPC . 464/23, 127, 180, 182; 403/271; 285/124.3
See application file for complete search history.

(56) References Cited

U.S. PATENT DOCUMENTS

| | | | | |
|---|---|---|---|---|
| 2,531,573 | A | * 11/1950 | Konikoff | ................. B23B 31/38 464/23 X |
| 7,507,161 | B2 | * 3/2009 | Worman, Jr. | ........... F16D 1/068 464/182 X |

FOREIGN PATENT DOCUMENTS

| | | | | |
|---|---|---|---|---|
| JP | 57-157824 A | * | 9/1982 | ................... 464/180 |
| JP | 57-157824 A | * | 9/1992 | |

* cited by examiner

*Primary Examiner* — Gregory Binda
(74) *Attorney, Agent, or Firm* — Locke Lord LLP; Joshua L. Jones; Daniel J. Fiorello

(57) ABSTRACT

An end fitting for a drive shaft includes a shaft weld side having a face configured for fluid communication with an interior of a shaft with the shaft weld side welded to a shaft. The end fitting also includes a coupling side shaped to be operatively connected to a component for transferring rotational motion from the end fitting to the component. The end fitting further includes a pressure relief bore defined in the end fitting between the face of the shaft weld side and the coupling side such that fluid can flow between the shaft weld side and the coupling side through the pressure relief bore.

6 Claims, 3 Drawing Sheets

END FITTINGS FOR DRIVE SHAFT ASSEMBLIES

BACKGROUND

1. Field

The present disclosure relates to drive shaft assemblies having end fittings, more specifically to drive shaft assemblies having welded end fittings, such as those used in ram air turbines for aerospace applications.

2. Description of Related Art

Some traditional drive shaft assemblies consist of a long tube shaft and two end fittings. The end fittings and tube shaft fit tightly together via close-tolerance interfaces. They are subsequently joined permanently together using an electron beam welding (EBW) process. It is desirable to seal the inner portion of the shaft from the atmosphere during assembly so as to prevent corrosion and pollution inside the shaft during use. The EBW process is typically performed in a vacuum chamber. Molten welds, however, have been seen to develop voids due to the surrounding vacuum causing the air trapped within the tubular shaft to escape through the EBW joint area. This weld void problem results in unsatisfactory weld quality.

However, merely evacuating the shaft before or during the weld process leads to a sealed vacuum inside the shaft after welding is complete, which can be detrimental to the performance and life span of the drive shaft assembly. Such conventional methods and systems have generally been considered satisfactory for their intended purpose. However, there is still a need in the art for improved drive shaft assemblies and methods. The present disclosure provides a solution for this need.

SUMMARY

An end fitting for a drive shaft includes a shaft weld side having a face configured for fluid communication with an interior of a shaft with the shaft weld side welded to a shaft. The end fitting also includes a coupling side shaped to be operatively connected to a component for transferring rotational motion from the end fitting to the component. The end fitting further includes a pressure relief bore defined in the end fitting between the face of the shaft weld side and the coupling side such that fluid can flow between the shaft weld side and the coupling side through the pressure relief bore.

The end fitting can further include a balance weight aperture defined in the coupling side to retain one or more balance weights. The pressure relief bore can be defined in the balance weight aperture. A plurality of pressure relief bores can be disposed in a plurality of the balance weight apertures.

The end fitting can include a plurality of balance weight apertures. An indicator indicating which balance weight aperture(s) has (have) a pressure relief bore therein can be included to enable visual recognition thereof.

The indicator can include a channel that is less deep than the balance weight apertures and extends at least partially on either side of the balance weight aperture with the pressure relief bore disposed therein.

A drive shaft assembly includes a shaft and at least one end fitting as described above. These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
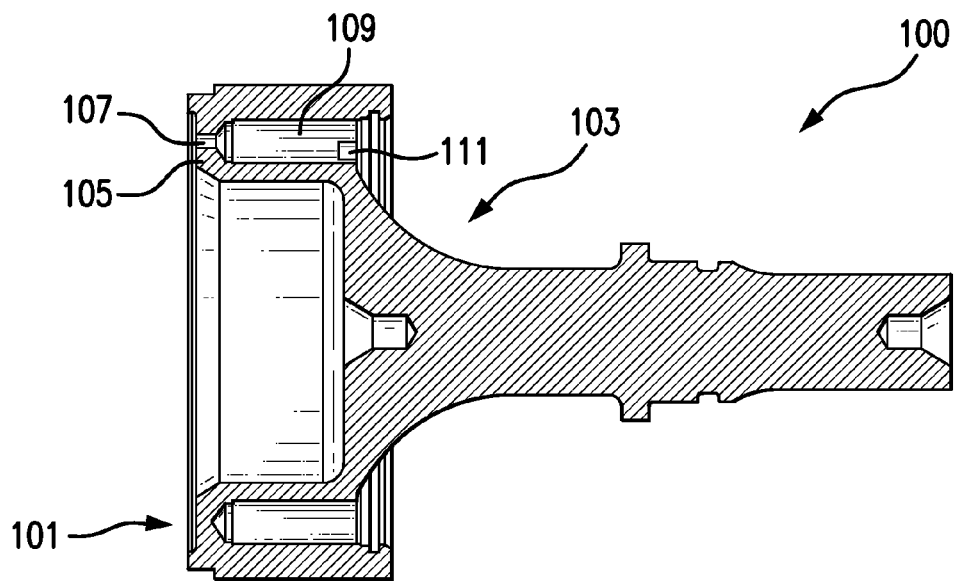
FIG. 1A is a cross-sectional elevation view of an embodiment of an end fitting in accordance with this disclosure, showing a pressure relief bore disposed therein.

Reference will now be made to the drawings wherein like reference numerals identify similar structural features or aspects of the subject disclosure. For purposes of explanation and illustration, and not limitation, an illustrative view of an embodiment of an end fitting in accordance with the disclosure is shown in FIG. 1A and is designated generally by reference character 100. Other embodiments and/or aspects of this disclosure are shown in FIGS. 1B-2B. The systems and methods described herein can be used to improve drive shaft manufacturing and performance.

Figure 1B:
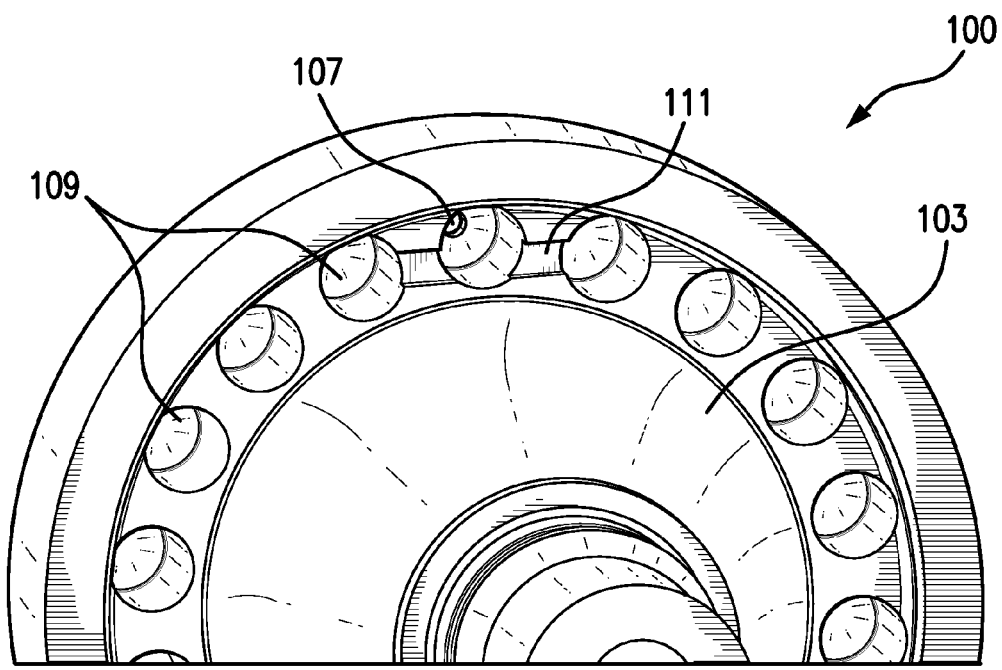
FIG. 1B is a perspective view of the end fitting of FIG. 1A.
Figure 1C:
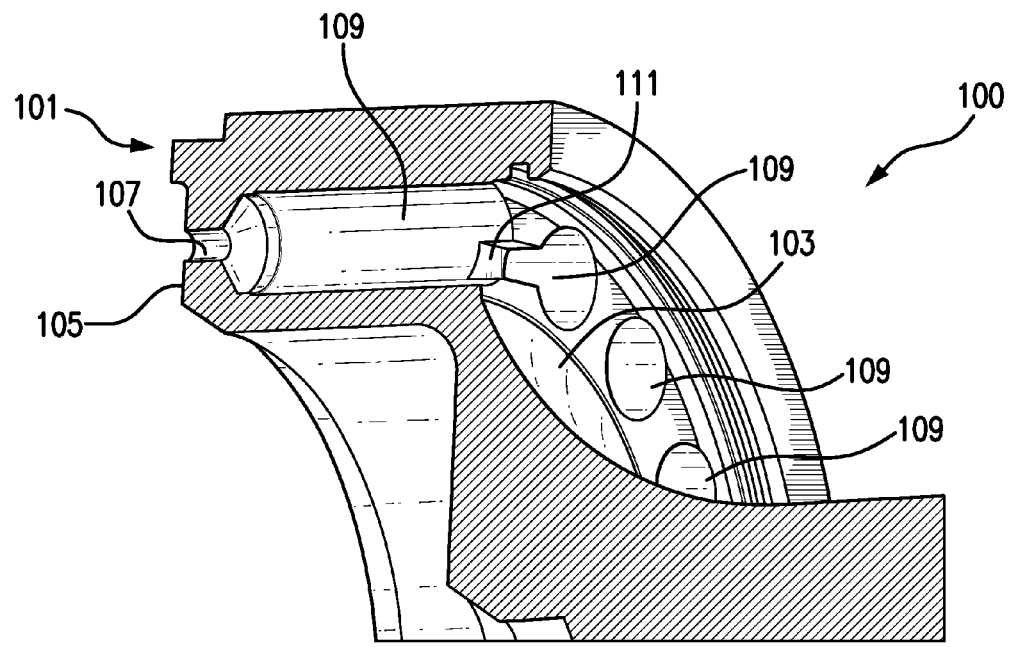
FIG. 1C is a cross-sectional perspective view of the end fitting of FIG. 1A.
Figure 2A:
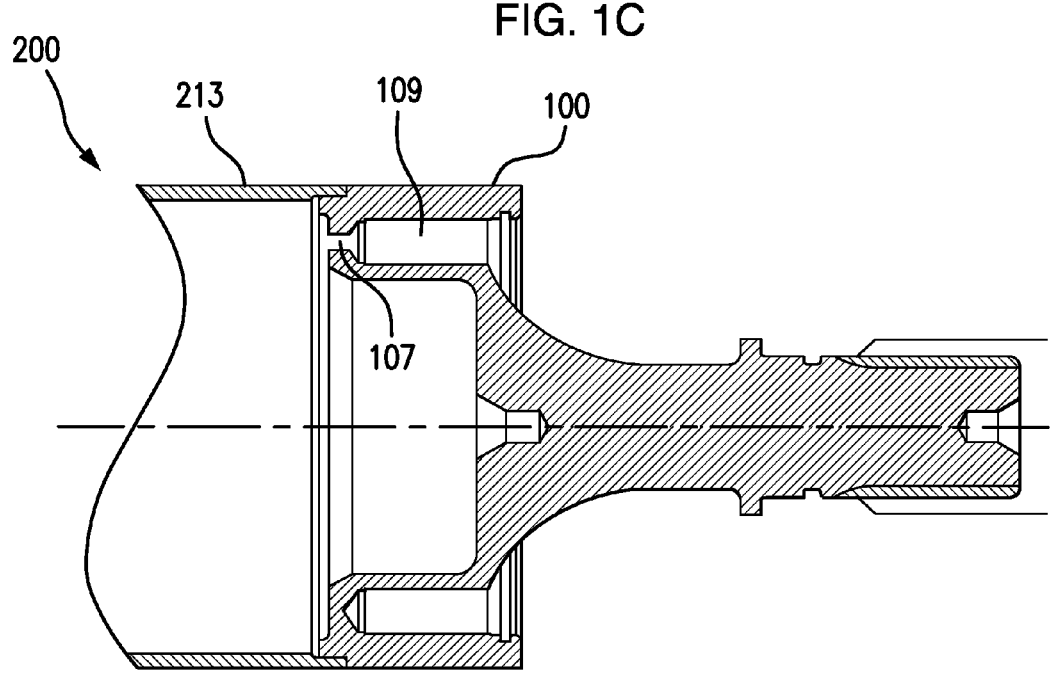
FIG. 2A is a cross-sectional view of an embodiment of an end fitting in accordance with this disclosure, shown connected to a shaft and having the inner shaft portion open to the atmosphere through a pressure relief bore.

Referring to FIGS. 1A-1C, an end fitting 100 for a drive shaft includes a shaft weld side 101 having a face 105 that is in fluid communication with an interior of a shaft (e.g., shaft 213 as shown in FIG. 2A) when the shaft weld side 101 is welded to a shaft. The end fitting 100 also includes a coupling side 103 shaped to be operatively connected to a component (not shown) for transferring rotational motion from the end fitting 100 to the component.

A pressure relief bore 107 is defined in the end fitting 100 between the face 105 of the shaft weld side 101 and the coupling side 103 such that fluid can flow between the shaft weld side 101 and the coupling side 103 through the pressure relief bore 107 during the welding process. The pressure relief bore 107 can be any suitable shape and/or size.

Figure 2B:
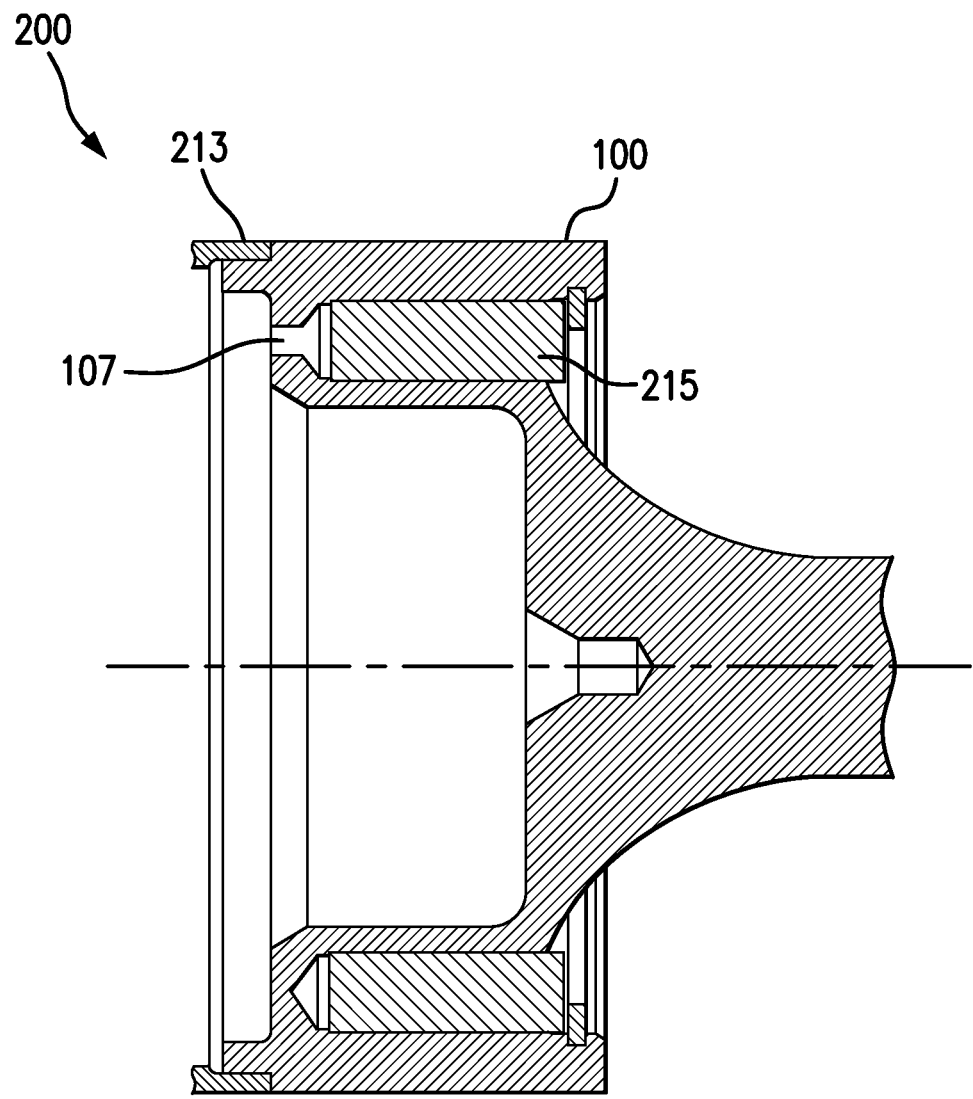
FIG. 2B is a cross-sectional view of the end fitting of FIG. 2A, shown connected to a shaft and having balance weights disposed therein and sealing the inner shaft portion from the atmosphere.

As shown, the end fitting 100 can further include a balance weight aperture 109 defined in the coupling side 103 to retain one or more balance weights (e.g., balance weights 215 as shown in FIG. 2B). The pressure relief bore 107 can be defined in the balance weight aperture 109 in any suitable location therein (e.g., centrally axially aligned or off-center).

As shown in FIGS. 1B and 1C, the end fitting 100 can include a plurality of balance weight apertures 109. Referring to FIG. 1B, an indicator 111 indicating which balance weight aperture 109 has a pressure relief bore 107 disposed therein can be included to enable visual recognition thereof. The indicator 111 can include a channel defined in the coupling side 103 that is less deep than the balance weight apertures 109 and that extends at least partially on either side of the balance weight aperture 109 with the pressure relief bore 107 disposed therein. While only a single pressure relief bore is shown, it is contemplated that a plurality of pressure relief bores 107 can be disposed in a plurality of the balance weight apertures 109 in any suitable manner, combination, or relative position. For example, the pressure relief bores 107 can be disposed about 90 degrees circumferentially relative to each other.

Referring to FIG. 2A, a drive shaft assembly 200 includes a shaft 213 and at least one end fitting 100 as described above. The shaft 213 can be welded on to the end fitting 100 in any suitable manner (e.g., electron beam welding (EBW)). During and after welding, the pressure inside the shaft 213 can equalize through the pressure relief aperture 107. After welding and after allowing the pressure to equalize, the pressure relief aperture 107 can be sealed in any suitable manner.

For example, in EBW, the inner portion of the shaft 213 is evacuated through the pressure relief bore 107 during the EBW procedure because the procedure occurs in a vacuum environment. After welding is complete, air can be allowed to enter the shaft 213 through pressure relief bore 107. Referring to FIG. 2B, in embodiments where the pressure relief bore 107 is located in the balance weight aperture 109, the pressure relief bore 107 can then be sealed by a balance weight 215 being inserted into the balance weight aperture 109. The balance weight 215 can seal the pressure relief bore 107 in any suitable manner (e.g., via a friction fit, adhesives, welding).

An advantage to the above is that all shaft assemblies that require balance weights 215 have at least one balance weight aperture 109 that is filled in by a balance weight 215 anyhow. Therefore, no additional manufacturing or sealing steps need be taken to obtain a sealed shaft 213 with equalized pressure therein, whereas embodiments having other bore 107 locations would require an additional sealing step.

The devices, methods, and systems of the present disclosure, as described above and shown in the drawings, provide for a shaft assembly with superior properties including equalized pressure inside the shaft thereof without adding manufacturing cost and while maintaining material and connection quality. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An end fitting for a drive shaft, comprising:
   a shaft weld side including a face configured for fluid communication with an interior of a shaft with the shaft weld side welded to a shaft;
   a coupling side shaped to be operatively connected to a component for transferring rotational motion from the end fitting to the component;
   a pressure relief bore defined in the end fitting between the face of the shaft weld side and the coupling side such that fluid can flow between the shaft weld side and the coupling side through the pressure relief bore;
   a plurality of balance weight apertures defined in the coupling side to retain one or more balance weights, wherein the pressure relief bore is defined in at least one of the plurality of balance weight apertures; and
   an indicator indicating which balance weight aperture has a pressure relief bore therein to enable visual recognition thereof, wherein the indicator includes a channel that is less deep than the balance weight apertures and extends at least partially on either side of the balance weight aperture with the pressure relief bore disposed therein.

2. The end fitting of claim 1, further including a plurality of pressure relief bores disposed in the plurality of the balance weight apertures.

3. A drive shaft assembly, comprising:
   a shaft; and
   an end fitting welded to the shaft, the end fitting comprising:
   a shaft weld side including a face configured for fluid communication with an interior of a shaft with the shaft weld side welded to a shaft;
   a coupling side shaped to be operatively connected to a component for transferring rotational motion from the end fitting to the component;
   a pressure relief bore defined in the end fitting between the face of the shaft weld side and the coupling side such that fluid can flow between the shaft weld side and the coupling side through the pressure relief bore; and
   a plurality of balance weight apertures defined in the coupling side to retain one or more balance weights;
   wherein the pressure relief bore is defined in at least one of the plurality of balance weight apertures.

4. The end fitting of claim 3, further comprising an indicator indicating which balance weight aperture has a pressure relief bore therein to enable visual recognition thereof.

5. The end fitting of claim 4, wherein the indicator includes a channel that is less deep than the balance weight apertures and extends at least partially on either side of the balance weight aperture with the pressure relief bore disposed therein.

6. The end fitting of claim 3, a plurality of pressure relief bores disposed in at least one of the plurality of the balance weight apertures.

* * * * *